US012738529B2

(12) United States Patent
Hwang et al.

(10) Patent No.: US 12,738,529 B2
(45) Date of Patent: Sep. 15, 2026

(54) LIQUID ELECTROLYTIC MEDIUM AND APPLICATION IN SOLID STATE LI BATTERIES THEREOF

(71) Applicant: National Taiwan University of Science and Technology, Taipei (TW)

(72) Inventors: Bing-Joe Hwang, Taipei (TW); She-Huang Wu, Taipei (TW); Shi-Kai Jiang, Taipei (TW); Wei-Nien Su, Taipei (TW); Jing-Hong Chen, Taipei (TW); Sheng-Chiang Yang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 995 days.

(21) Appl. No.: 17/741,594

(22) Filed: May 11, 2022

(65) Prior Publication Data

US 2023/0100839 A1 Mar. 30, 2023

(30) Foreign Application Priority Data

Sep. 27, 2021 (CN) .......................... 202111135112.4
Sep. 27, 2021 (TW) ................................ 110135835

(51) Int. Cl.
*H01M 10/056* (2010.01)
*H01M 4/505* (2010.01)
(Continued)

(52) U.S. Cl.
CPC ......... *H01M 10/056* (2013.01); *H01M 4/505* (2013.01); *H01M 4/525* (2013.01); *H01M 10/0525* (2013.01); *H01M 2004/028* (2013.01)

(58) Field of Classification Search
CPC ........... H01M 10/056; H01M 10/0562; H01M 10/0525; H01M 10/0568; H01M 10/0569;
(Continued)

(56) References Cited

U.S. PATENT DOCUMENTS

2014/0227578 A1* 8/2014 Yoshida ............ H01M 10/0562 429/126
2018/0205111 A1* 7/2018 Yushin .............. H01M 10/0569
2019/0214672 A1* 7/2019 Chang ................. H01M 50/431

FOREIGN PATENT DOCUMENTS

CN 111825704 A 10/2020
CN 114349893 A * 4/2022
(Continued)

*Primary Examiner* — Dah-Wei D. Yuan
(74) *Attorney, Agent, or Firm* — Best & Flanagan LLP

(57) ABSTRACT

Present invention is related to a liquid electrolytic medium having non-polar or extreme low polar solvents TTE, FEC, and EMC and a lithium salt with the concentration not exceeding the saturation concentration of the said solvents. The lithium salt in the present invention is preferred to be any lithium salt other than LiPF6. The liquid electrolytic medium of the present invention is compatible with solid state Li batteries using sulfide solid electrolytes and has the abilities to avoid high voltage decomposition during cycle life of the batteries. The liquid electrolytic medium is easy to produce without alternating any existing procedures performed in the factory in the conventional manufacturing process. As introducing the liquid electrolytic medium, the Li batteries still can perform efficiently with high interface conductivity and the sulfide solid electrolyte will not be attacked or damaged by the present invention.

10 Claims, 5 Drawing Sheets

(51) Int. Cl.
*H01M 4/525* (2010.01)
*H01M 10/0525* (2010.01)
*H01M 4/02* (2006.01)

(58) Field of Classification Search
CPC . H01M 2004/028; H01M 4/505; H01M 4/525
See application file for complete search history.

(56) References Cited

FOREIGN PATENT DOCUMENTS

CN 115882046 A * 3/2023
CN 112786967 A 6/2024
CN 120376751 A * 7/2025

* cited by examiner

Before cutting

After cutting

LIQUID ELECTROLYTIC MEDIUM AND APPLICATION IN SOLID STATE LI BATTERIES THEREOF

FIELD OF INVENTION

Present invention is related to a liquid electrolytic medium, particularly a liquid electrolytic medium with solid sulfide electrolyte compatibility.

A primary application of the liquid electrolytic medium provided by the present invention will be used in a solid-state lithium battery containing a sulfide electrolyte, and this particular application will be described herein and illustrated in detail below, but the present invention is not limited to this single application. Other applications performed with same or equivalent functions should all protect or contain within the patent scope of the present invention.

BACKGROUND OF THE INVENTION

Commercial lithium batteries usually contain an electrolyte utilizing a polar solvent that can rinse pores of electrode powders of the lithium battery. This polar solvent is able to reduce an electrode interface impedance, and increase the conductivity for the lithium battery. However, if this polar electrolyte is used in a solid-state lithium battery using a solid-state electrolyte, the solid-state electrolyte will be attacked or interfered by the polar solvent when cycling life time. As such, surface and structure of the solid-state electrolyte will be decomposed and destroyed to affect its performance.

On the other side, the electrolyte using polar solvents is commonly applied to two interfaces in a solid-state lithium battery. One is on a positive electrode and the other could be an interface between the positive electrode and the solid-state electrolyte or even can be applied to a powder-type negative electrode. However, the polar solvent is very easy to form impedances between the positive or negative electrode itself and also the interface between the positive electrode and the solid-state electrolyte. The electrodes need to be employed more process to ease such problems which undoubtedly will increase the production and manufacturing costs. Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the problem that the electrolyte containing polar solvents of the conventional solid-state lithium battery will cause the electrolytes to decompose, destroy and lose its functions, the present invention provides a liquid electrolyte medium comprising: a liquid electrolytic medium comprises: fluorinated ether; a first and a second carbonates; a lithium salt; wherein: the fluorinated ether and the first and second carbonates are non-polar solvents, and the molar ratios are at a range of 5-40%, 30-60%, and 5-35% respectively; and the lithium salt which is a non $LiPF_6$ lithium slat with concentration not exceeding a saturation concentration of a solvent mixture of the fluorinated ether and the first and second carbonates under temperature at a range of −10 to 60° C.

In accordance, the present invention also provides a solid electrolyte lithium battery comprising: a positive electrode includes a positive electrode material contacting with a solid electrolyte, and the positive electrode material is a powder or particle or granule filled with the liquid electrolyte medium as mentioned above.

In accordance, the present invention has the following advantages:

The present invention provides an electrolyte medium containing polar free solvent or extremely low polar solvent which is compatible with sulfide solid electrolyte and can avoid such solid electrolyte from high voltage decomposition. The electrolyte medium can be filled to the solid electrolyte with existing production line without changing or using extra or additional equipment or device for assembling. The electrolyte medium of present invention can maintain high ionic conductivity for the positive electrode and the interface between the electrode and the electrolyte medium and also prevent the solid electrolyte being attacked by the electrolyte causing any surface or structure damage or decomposition.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
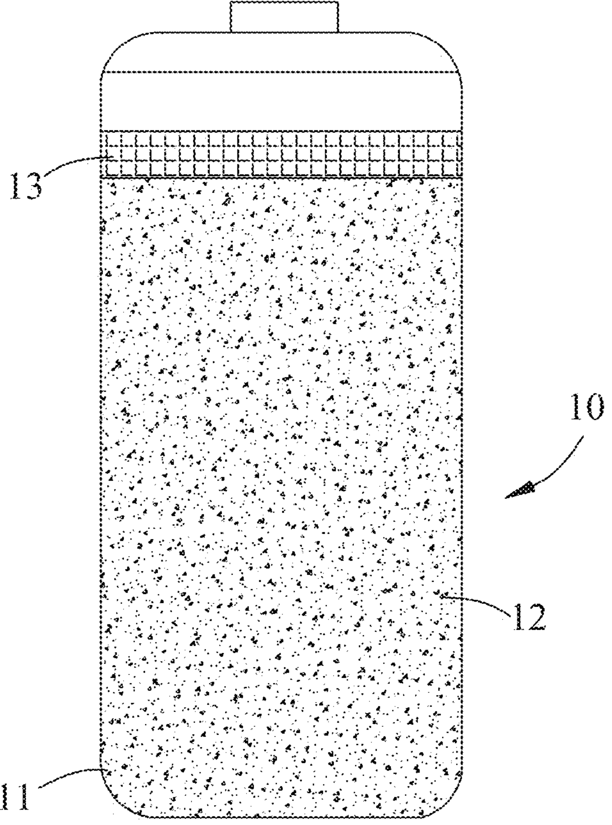
FIG. 1 is an illustration of a preferred embodiment of applying the liquid electrolytic medium to an anode-free solid electrolyte lithium battery in accordance with the present invention.

Reference will now be made in detail to the presently preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

<Liquid Electrolytic Medium>

A first preferred embodiment of the liquid electrolytic medium of the present invention includes a liquid solution containing:

a fluorinated ether;

a first and a second carbonates; wherein:

the fluorinated ether and the first and second carbonates are non-polar solvents, and the molar ratios are at a range of 5-40%, 30-60%, and 5-35% respectively; and a lithium salt which is a non-LiPF6 lithium slat with concentration not exceeding a saturation concentration of a solvent mixture containing the fluorinated ether and the first and second carbonates under temperature at a range of −10 to 60° C.

The fluorinated ether include 1,1,2,2-tetrafluoroethyl-2,2,3,3-tetrafluoropropyl ether (1,1,2,2-tetrafluoroethyl 2,2,3,3-tetrafluoropropyl ether, TTE). The first and the second carbonates are: Fluoroethylene Carbonate (FEC), Ethyl Methyl Carbonate (EMC). The lithium salt is preferably to be any lithium salt but LiPF6, such as Lithium bis(trifluoromethanesulfonyl) imide (LiTFSI), Lithium Perchlorate ($LiClO_4$), Lithium hexafluoroarsenate(V) ($LiAsF_6$), Lithium hexafluoroantimonate ($LiSbF_6$), Lithium tetrachloroaluminate ($LiAlCl_4$), Lithium tetrachlorogallate ($LiGaCl_4$), Lithium nitrate ($LiNO_3$), $LiC(SO_2CF_3)_3$, Lithium Bis(Trifluoromethanesulfonyl)imide ($LiN(SO_2CF3)_2$), Lithium thiocyanate hydrate (LiSCN), $LiO_3SCF_2CF_3$, $LiC_6F_5SO_3$, $LiO_2CCF_3$, Lithium fluorosulphate ($LiSO_3F$), Lithium tetraphenylborate ($LiB(C_6H_5)_4$), Lithium trifluoromethanesulfonate ($LiCF_3SO_3$), Lithium difluoro(oxalate)borate (LiDFOB) and combination thereof.

The TTE, FEC, and EMC in the present invention are non-polar solvents individually to form the mixture solvent as a ternary non-polar solvent for mixing with the lithium salt. More preferably, the TTE, FEC, and EMC are mixed with the TTE, FEC, and EMC in a mole ratio of 3:5:2. The lithium salt is preferably to be any lithium salt other than lithium hexafluorophosphate (LiPF6), such as lithium bis-trifluoromethanesulfonylimide (Lithium bis(trifluoromethanesulfonyl)imide, LiTFSI). The lithium salt is mixed in the ternary non-polar solvent not exceeding the saturated concentration to avoid precipitates when mixed with the ternary non-polar solvent in the aforementioned temperature range. For example, the lithium salt is preferably mixed with the ternary non-polar solvents in the concentration of 0.5M to 4.0M, or more preferably 0.5~2.0M.

<Solid-State Electrolyte Lithium Battery (Full Battery)>

With reference to FIG. 1, the present invention applies the aforementioned liquid electrolytic medium to a preferred embodiment of an anode-free solid electrolyte lithium battery including:

A positive electrode 10; wherein the positive electrode 10 includes a positive electrode material 11 contacting with a solid electrolyte 13. The positive electrode material 11 is preferably to be a powder and filled with the aforementioned liquid electrolyte medium 12.

The solid electrolyte 13 in this preferred embodiment preferably comprises a sulfide solid electrolyte or an oxide solid electrolyte. The sulfide solid electrolyte in the present invention preferably comprises (100-x)$Li_2S$-x$P_2S_5$, such as $Li_7P_3S_{11}$; (100-x)$Li_2S$-x$P_2S_5$ mixed with lithium compounds (LiX), such as $Li_6PS_5Cl$; (100-x)$Li_2S$-x$P_2S_5$ mixed with a sulfur compound ($M_xS_y$); and (100-x)$Li_2S$-x$P_2S_5$ mixed with both lithium compound (LiX) and sulfur compound ($M_xS_y$). The aforementioned x is a positive integer less than 100. More preferably, the aforementioned lithium compound (LiX) includes lithium chloride, lithium bromide, lithium iodide, or any combination thereof (X=Cl, Br, I, or a combination thereof). The aforementioned sulfide compound ($M_xS_y$) includes germanium disulfide, silicon disulfide, Tin disulfide, molybdenum disulfide, aluminum sulfide, nickel sulfide or any combination thereof ($M_xS_y$=$GeS_2$, $SiS_2$, $SnS_2$, $MoS_2$, $Al_2S_3$, $Ni_3S_2$ or a combination thereof).

The positive electrode material 11 is preferably to be a powder or particle or granule with ideally porous structures, and it includes $LiNi_xMn_yCo_zO_2$ (where a sum of x+y+z=1 with x, y, and z to be any positive number), $LiNi_xAl_yCo_zO_2$ (where a sum of x+y+z=1 with x, y, and z to be any positive number), $LiMPO_4$ (where M is iron, cobalt, nickel, manganese, or a combination thereof), $LiMSO_4F$ (where M is iron, cobalt, nickel, manganese, aluminum, or a combination thereof) and $Li_2M$ (where M is sulfur, selenium, selenium, or a combination thereof). A preferred embodiment of the positive electrode material 11 in the present invention is $LiNi_{0.8}Mn_{0.1}Co_{0.1}O_2$ (NMC811). On the other hand, since the liquid electrolytic medium 12 provided by the present invention is suitable for the positive electrode material 11 in powder or particle or granule form to solve the high interface impedance within these solid state materials. The liquid electrolytic medium 12 provided by the present invention can improve the interface impedance by filling or rinsing such the porous structure.

It is worthy noticed that this embodiment uses an anode-free solid electrolyte lithium battery to have no negative electrode (no anode), or only a current collector (such as copper foil) to be operated as a full battery. However, the present invention can be used on any normal full battery includes/exclude a negative electrode. The liquid electrolytic medium 12 provided by the present invention can even to be filled in the negative electrode which can also reduce the problem of interface impedance and improve the performance of the full battery.

<Validation Tests>

First, following Chart 1 shows details of the preferred embodiments of the present invention and the comparative example using LiPF6 as the lithium salt. These embodiments and comparative example will be further conduct several performance tests for validating claimed functions.

CHART 1

| Embodiments of the present invention/ Comparative Examples | Ternary non-polar solvent | Lithium salt |
|---|---|---|
| Embodiment 1 | FEC:TTE:EMC = 3:5:2 | 1.5M LiTFSI |
| Embodiment 2 | FEC:TTE:EMC = 3:5:2 | 1M LiTFSI |
| Example 1 | FEC:TTE:EMC = 3:5:2 | 1M LiPF6 |
| Example 2 | Pure solid electrolyte lithium battery without any additional liquid medium | |

Figures 2A, 2B:
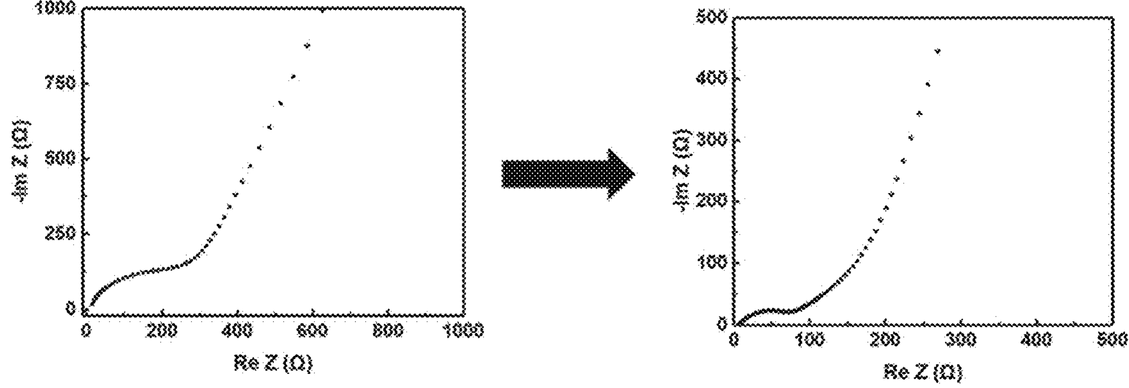
FIGS. 2A and 2B are the electrochemical impedance analysis of the embodiment 1 and comparative example 2 in accordance with the present invention.

With reference to FIGS. 2A and 2B, electrochemical EIS impedance analysis of the embodiment 1 and Example 2 are presented. As shown in the result, the impedance of embodiment 1 of the present invention is significantly smaller than the impedance of example 2 without adding the liquid electrolytic medium 12. Further the impedance are converted into the impedance values as 80 ohms and 275 ohms respectively which shows that the liquid electrolytic medium 12 of the present invention can successfully reduce the interface impedance between the electrode and the solid electrolyte.

Figure 3:
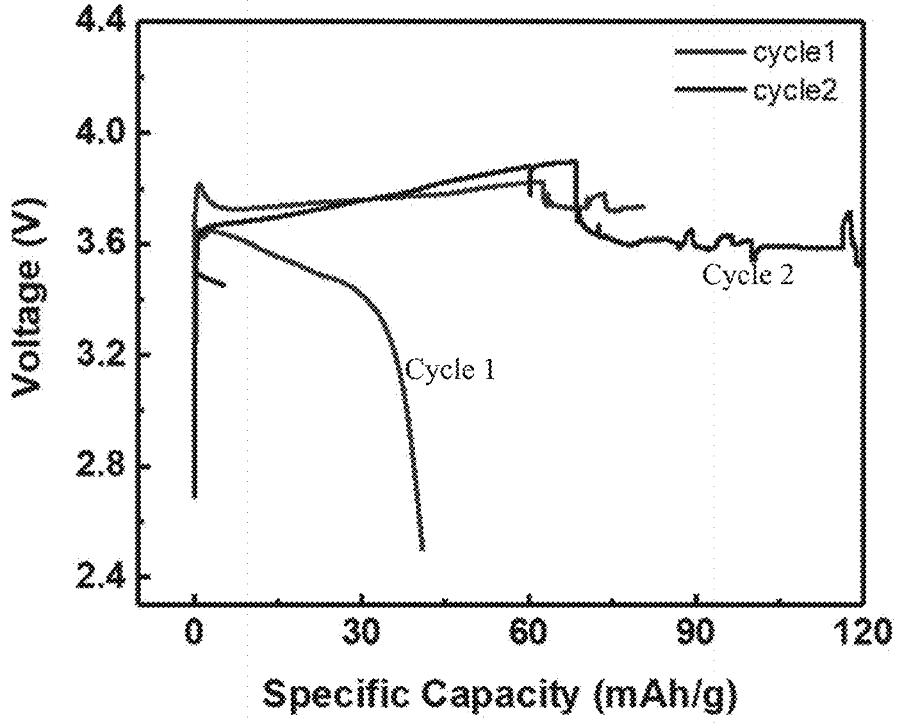
FIG. 3 is an illustration of relationship between the discharge capacity and voltage of the comparative Example 1.

FIG. 3 further shows a relationship between the discharge capacity and voltage of comparative example 1. In this test, the addition of LiPF6 as lithium salt leading the comparative example 1 having the consequence of increasing the polarity of the solvent and the polar electrolyte attacks the sulfide solid electrolyte for failed electrical curve to the full battery.

Figure 4A:
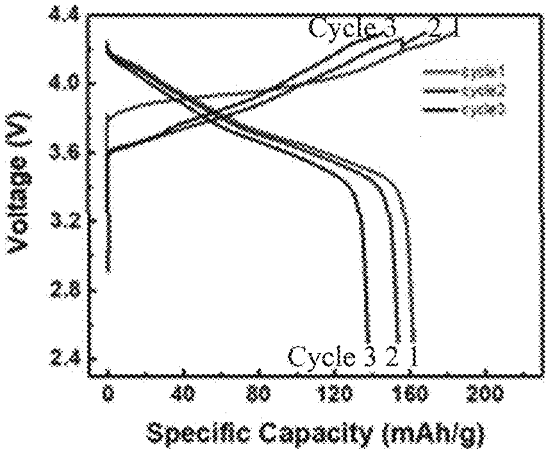
FIGS. 4A and 4B is an illustration of relationship between the discharge capacity and the voltage of the embodiments 1 and 2 in accordance with the present invention.
Figure 4B:
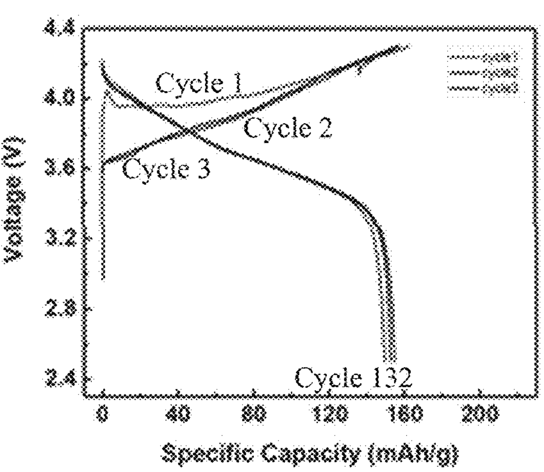

With reference to FIG. 4A and FIG. 4B, a relationship between the discharge capacity and voltage of the embodiments 1 and 2 of the present invention. As shown in the figures, the discharge capacity of embodiment 1 (155 mAh/g) is better than the discharge capacity of embodiment 2 (138 mAh/g) but both embodiments are better than the discharge capacity of the comparative example 1. By such series tests from FIGS. 3 to 4B of the full battery using electrolytes with different polarities, it can be proved that the low/non-polar solvent to be as the electrolyte in the present invention can really avoid or at least reduce the attack of electrolyte to the sulfide solid electrolyte by the polar solvent while maintaining a high degree of electrode conduction.

Figure 5A:
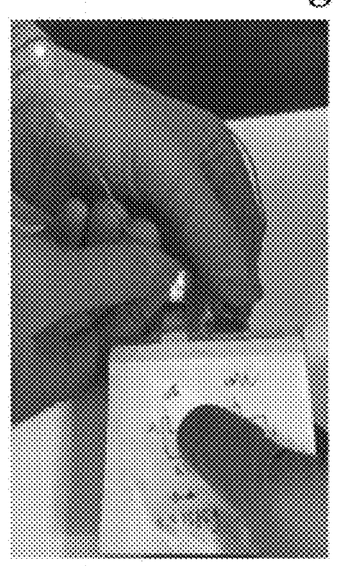
FIG. 5A is an illustration of the full battery filled with the liquid electrolyte medium in accordance with the present invention.
Figure 5B:
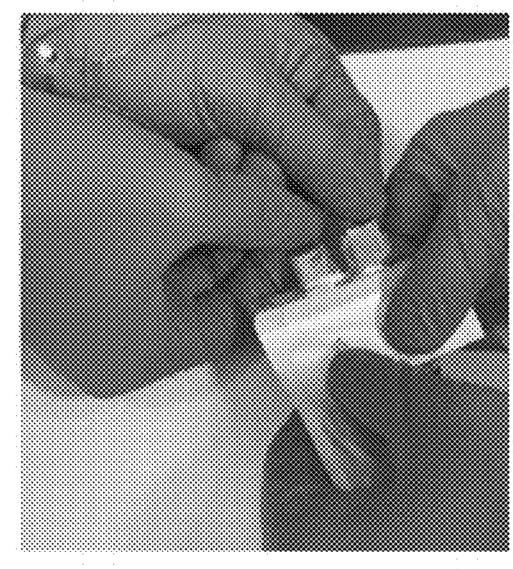
FIG. 5B is an illustration of the full battery shown in FIG. 5A after being directly cut with scissors.

With reference to FIGS. 5A and 5B, a solid-state lithium battery full battery using the liquid electrolyte medium 12 from embodiment 1 were filled within the positive electrode material 11 as shown in FIG. 5A. FIG. 5B further shows that after cutting the battery, there's no any leakage of the liquid electrolyte medium 12 to cause the short circuit or battery failure and still maintain in good performance of the solid electrolyte lithium battery.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A solid electrolyte lithium battery comprising: a positive electrode includes a positive electrode material contacting with a sulfide solid electrolyte, and the positive electrode material is a powder or particle or granule filled with a liquid electrolyte medium; wherein: the liquid electrolytic medium comprising:

a fluorinated ether comprising 1,1,2,2-tetrafluoroethyl-2,2,3,3-tetrafluoropropyl ether (TTE);

a first carbonate comprising fluoroethylene carbonate (FEC);

a second carbonate comprising ethyl methyl carbonate (EMC);

a lithium salt selected from the group consisting of Lithium bis(trifluoromethanesulfonyl)imide (LiTFSI), Lithium Perchlorate ($LiClO_4$), Lithium hexafluoroarsenate(V) ($LiAsF_6$), Lithium hexafluoroantimonate ($LiSbF_6$), Lithium tetrachloroaluminate ($LiAlCl_4$), Lithium tetrachlorogallate ($LiGaCl_4$), Lithium nitrate ($LiNO_3$), $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and Lithium difluoro (oxalato) borate (LiDFOB), and combinations thereof; wherein the fluorinated ether, the first carbonate, and the second carbonate are non-polar solvents, and the molar ratios are in a range of 5-40%, 30-60%, and 5-35% respectively; and the lithium salt has a concentration not exceeding a saturation concentration of the solvent mixture at a temperature range of −10° C. to 60° C.; and wherein the lithium salt is not lithium hexafluorophosphate ($LiPF_6$).

2. The solid electrolyte lithium battery as claimed in claim 1, wherein the solid electrolyte lithium battery further comprises a negative electrode.

3. The solid electrolyte lithium battery as claimed in claim 2, wherein the liquid electrolyte medium is filled in the negative electrode.

4. The solid electrolyte lithium battery as claimed in claim 1, wherein the solid electrolyte comprises a sulfide solid electrolyte or an oxide solid electrolyte.

5. The solid electrolyte lithium battery as claimed in claim 4, wherein the sulfide solid electrolyte comprises (100-x)$Li_2S_xP_2S_5$, (100-x)$Li_2S_xP_2S_5$ mixed with lithium compounds (LiX), (100-x)$Li_2S_xP_2S_5$ mixed with a sulfur compound ($M_xS_y$); and (100-x) $Li_2S_xP_2S_5$ mixed with both lithium compound (LiX) and sulfur compound ($M_xS_y$) where x is a positive integer less than 100 and X is Cl, Br, I, or a combination thereof.

6. The solid electrolyte lithium battery as claimed in claim 5, wherein the lithium compound comprises lithium chloride, lithium bromide, lithium iodide, or any combination thereof; and the sulfur compound comprises germanium disulfide, silicon disulfide, Tin disulfide, molybdenum disulfide, aluminum sulfide, nickel sulfide or any combination thereof.

7. The solid electrolyte lithium battery as claimed in claim 5, wherein the sulfide solid electrolyte comprises $Li_7P_3S_{11}$ or $Li_6PS_5Cl$.

8. The solid electrolyte lithium battery as claimed in claim 6, wherein the sulfide solid electrolyte comprises $Li_7P_3S_{11}$ or $Li_6PS_5Cl$.

9. The solid electrolyte lithium battery as claimed in claim 1, wherein the positive electrode material comprises one of $LiNi_xMn_yCo_2O_2$ (where a sum of x+y+z=1 with x, y, and z to be any positive number), $LiNi_xAl_yCo_zO_2$ (where a sum of x+y+z=1 with x, y, and z to be any positive number), $LiMPO_4$ (where M is iron, cobalt, nickel, manganese, or a combination thereof), $LiMSO_4F$ (where M is iron, cobalt, nickel, manganese, aluminum, or a combination thereof) and $Li_2M$ (where M is sulfur, selenium, selenium, or a combination thereof).

10. The solid electrolyte lithium battery as claimed in claim 2, wherein the positive electrode material comprises one of $LiNi_xMn_yCo_2O_2$ (where a sum of x+y+z=1 with x, y, and z to be any positive number), $LiNi_xAl_yCo_zO_2$ (where a sum of x+y+z=1 with x, y, and z to be any positive number), $LiMPO_4$ (where M is iron, cobalt, nickel, manganese, or a combination thereof), $LiMSO_4F$ (where M is iron, cobalt, nickel, manganese, aluminium, or a combination thereof) and $Li_2M$ (where M is sulfur, selenium, selenium, or a combination thereof).

* * * * *